United States Patent [19]

McLeod

[11] Patent Number: 4,874,396
[45] Date of Patent: Oct. 17, 1989

[54] BRIQUETS FOR SMOKE SEASONING FOOD PRODUCTS

[76] Inventor: H. C. McLeod, 1407 South Cir., Mt. Prospect, Ill. 60056

[21] Appl. No.: 220,478

[22] Filed: Jul. 18, 1988

[51] Int. Cl.$^4$ .................................................. C10L 5/40
[52] U.S. Cl. ....................................... 44/589; 44/590; 44/605; 44/606; 426/650; 426/652
[58] Field of Search .................. 44/589, 590, 605, 606, 44/600; 426/650, 652

[56] References Cited

U.S. PATENT DOCUMENTS

| | | | |
|---|---|---|---|
| 1,298,546 | 3/1919 | Mouck | 44/606 |
| 2,341,377 | 2/1944 | Hinderer | 44/590 |
| 3,709,700 | 1/1973 | Ross | 44/606 |

FOREIGN PATENT DOCUMENTS

| | | | |
|---|---|---|---|
| 42696 | 3/1983 | Japan | 44/606 |
| 2076 | of 1885 | United Kingdom | 44/589 |
| 158671 | 2/1921 | United Kingdom | 44/589 |

*Primary Examiner*—Carl F. Dees
*Attorney, Agent, or Firm*—Charles F. Lind

[57] ABSTRACT

The disclosed briquets comprise solid carrier means and a seasoning liquid impregnated into the carrier means; with the carrier means being both wet in appearance and to the touch and forming between 70-90% of the weight of the briquets and the seasoning liquid forming between 10-30% of the weight of the briquets. The carrier means are dried and absorbant, and may be 1-3 inch blocks of hard wood (oak) or crushed shells of fruitwood nuts including pecans, black walnuts, pistachios, almonds, and/or chestnuts. The seasoning liquid is noncombustible and includes: wine, soy sauce, molasses, whiskey, liquid smoke, real lemon extract, vinegar, and/or water; and bay leaves, onion powder, garlic powder, and/or Jamacian all spice. The liquid and solid components of the seasoning liquid are blended together in a ratio by weight of between 0.1-3% solid to 99.9-97% liquid materials. The briquets may be placed directly on or proximate to hot cooking coals, effective to generate fumes and/or smoke for seasoning food products as the same are being cooked.

15 Claims, No Drawings

BRIQUETS FOR SMOKE SEASONING FOOD PRODUCTS

FIELD OF THE INVENTION

This invention relates to means that when burned provide for smoke seasoning food products or the like.

BACKGROUND OF THE INVENTION

It is common to cook or barbecue food products by a radiantly-hot open flame, of charcoal or of artifical coals heated by gas or electricity, such as on an open grill or in an enclosed oven. Food products cooked in this manner generally have a distinctive and appealing taste. The food products may further be seasoned by marinating them in a spiced sauce before cooking, and/or by spreading a seasoning directly on them, before or during cooking. Both of these seasoning methods require special efforts and/or prior preparation, including possible repeated applications as the food products are being cooked.

SUMMARY OF THE INVENTION

A basic object of the present invention is to provide treated briquets that may be placed directly on or proximate to the burning charcoal or heated coals, effective then upon being heated and/or burned to generate smoke and/or fumes for penetrating and seasoning the food products simultaneously as the radiant cooking thereof is taking place.

To achieve this and other objects, the present invention may provide carrier means, such as 1-3 inch dried wood cubes or dried crushed shells of fruitwood nuts, soaked with a seasoning liquid, to provide briquets having approximately 70-90% weight from the solid carrier means, and approximately 30-10% weight from the seasoning liquid, the briquets being wet both in appearance and to the touch. The seasoning liquid may be formed from appropriate blends of liquid components including wine, soy sauce, molasses, whiskey, liquid smoke, real lemon extract, vinegar, and/or water; and dry mix components including bay leaves, onion powder, garlic powder, Jamacian all spice, Burmese black pepper, and/or Burmese red peppercorn.

DETAILED DESCRIPTION OF AN ILLUSTRATED EMBODIMENT

The smoke seasoning briquet invention to be disclosed herein has solid carrier means that are impregnated with a seasoning liquid. The solid carrier means is absorbant; and may be combustible without yielding offensive smoke or fumes, such as of dried hard wood or dried crushed shells of nuts. The seasoning liquid is nonflamable or combustible, and may be formed from appropriate blends of wine, soy sauce, molasses, whiskey, liquid smoke, real lemon extract, vinegar, and water; and dry mix spices including bay leaves, onion powder, garlic powder, Jamacian all spice, Burmese black pepper, and/or Burmese red peppercorn. The treated briquets may have approximately 70-90% weight from the solid carrier means and approximately 30-10% weight from the seasoning liquid, and will be wet both in appearance and to the touch. The wet briquets will generally support combustion only after extended exposure to the heat of the coals, after much or even most of the seasoning liquids has been driven off of the solid carrier means.

EXAMPLE 1.

In a first embodiment, the seasoning liquid may have:
Liquid components, consisting of approximately:
  15-50% burgundy wine, such as 30-35%,
  15-40% Chinese molasses, such as 30-35%,
  15-40% Chinese oriental soy sauce, such as 30-35%,
  2-10% Kentucky straight bourbon whiskey, such as 4-6%,
  0.1-2% liquid smoke, such as 0.7-1%; and
Dry mix components, consisting of approximately:
  50-250 parts bay leaves, such as 80-125 parts,
  0.5-5 parts Burmese onion powder, such as 0.9-1.5 part, and
  0.05-5 parts Burmese garlic powder, such as 0.9-1.5 part.

Water may also be added, to provide that the seasoning liquid is nonflamable, and to adjust the concentration to that needed and desired. This may provide the addition of between 0.05-5 parts water per part of liquid components, such as 0.1-1 part. The dry mix and liquid components, when blended together, are in a ratio by weight of between 0.1-3% dry mix components to 99.9-97% liquid components, such as 0.3-0.5%.

The carrier means may be a hard wood, such as oak, dried to be combustible and readily absorbant, and split or cut to blocks or cubes of 1-3 inch, preferably around 2 inches. The wood carrier means are soaked or marinated in the seasoning liquid, with occasional stirring, for approximately one-ten days. During this period, the wood carrier means, initially lighter than the seasoning liquid, will absorb enough of the seasoning liquid to sink in the liquid. After marination, the excess seasoning liquid is drained off, and approximately 70-90% of the weight of the treated briquets is from the solid carrier means and approximately 10-30% is from the seasoning liquid, such as 80-85% solid and 20-15% liquid. The treated briquets are wet both in appearance and to the touch.

When packaging the treated briquets, some of the same seasoning liquid may be reintroduce into the package, to provide excess seasoning liquid in the package in liquid form.

EXAMPLE 2.

In a second embodiment, the seasoning liquid may have:
Liquid components, consisting of approximately:
  30-65% burgundy wine, such as 35-45%,
  20-40% Chinese oriental soy sauce, such as 30-35%,
  5-20% Chinese molasses, such as 12-15%,
  2-10% real lemon extract,, such as 5-7%,
  2-10% Kentucky straight bourbon whiskey, such as 5-7%, and
  0.02-0.5% Tung Chun distilled vinegar, such as 0.1-0.2%;
and
Dry mix components, consisting of approximately:
  2-10 parts Burmese onion powder, such as 4-6 parts,
  2-10 parts Burmese garlic powder, such as 4-6 parts,
  2-10 parts Burmese black pepper, such as 2-6 parts,
  2-10 parts Burmese red pepper, such as 2-6 parts, and
  2-10 parts Jamacian all spice, such as 2-6 parts.

0.5-5 parts bay leaves, such as 1-2 parts,

Water may also be added, to provide that the seasoning liquid is nonflamable, and to adjust the concentration to that needed and desired. This may provide the addition of between 0.05-5 parts water per part of liquid components, such as 2-3 parts. The dry mix and liquid components, when blended together, are in a ratio by weight of between 0.1-3% dry mix components to 99.9-97% liquid components, such as 0.4-0.6%.

The carrier means may be crushed shells of fruitwood nuts, dried to be readily absorbant and combustible, as briquets. The nut shells will preferably include different kinds of nuts, such as pecan primarily, and at least two others from a group consisting of black walnuts, pistachio nuts, almond nuts, and chestnuts. The nut shells may include, by volume:

40-90 parts pecan nuts, such as 70-85 parts,
0-15 parts black walnut nuts, such as 3-6 parts,
0-15 parts pistachio nuts, such as 3-6 parts,
0-15 parts almond nuts, such as 3-6 parts, and
0-15 parts chestnuts, such as 3-6 parts.

The dried nut shells are soaked or marinated in the seasoning liquid, with occasion stirring, for approximately one-ten days, and they too generally will sink in the seasoning liquid. After marination, the excess seasoning liquid is drained off, and approximately 70-90% of the weight of the treated nut shells or briquets is from the solid carrier means and approximately 30-10% is from the seasoning liquid. The treated briquets are wet both in appearance and to the touch.

When packaging the treated briquets, some of the same seasoning liquid may be reintroduce into the package, to provide excess seasoning liquid in the package in liquid form.

USE OF THE OPERATION

To use the treated smoke seasoning briquets, the burning charcoal or heated coals are brought to cooking temperatures, ready for cooking, such as on an open grill or in an enclosed oven. The treated briquets are then placed directly on the charcoal or coals, or contained in a package of noncombustible liquid-tight material, such as aluminum foil. The package is then placed on or proximate to the charcoal or coals.

The package will be open or perforated on the top to allow the escape of the generated smoke and fumes; and also may be perforated on the bottom to allow restricted drainage of the excess seasoning liquid onto the hot coals.

The food products to be cooked are located on the grill, in proximity to the treated briquets. As the briquets burn and/or as the excess seasoning liquid vaporizes, fumes and/or smoke is generated, ladened with the spices of the seasoning liquid. The food products are then exposed to the generated fumes and smoke, simultaneously with being exposed to the cooking heat of the charcoal or coals.

Generally, a single application of the treated briquets will be effective for 10-30 minutes; whereas if the duration of cooking needed for the food products is beyond this, additional applications of the treated briquets may be made as needed relative to the charcoal or coals.

The amount of treated briquets needed for application generally will be between 5-25% that of the size of the fire mass, of charcoal or artifical coals. Thus, between 4-20 briquets of the treated wood briquets may be needed, while between 0.1-0.5 liters of the treated crushed nut shells briquets may be needed, for cooking on a typical domestic outdoor grill having a grill area between 0.1-1 square meters.

What is claimed as my invention is:

1. For use in cooking food products with charcoal or artifically heated coals, briquets adapted to be placed directly on or proximate to hot coals effective to generate fumes and/or smoke for seasoning the food products with spices as the products are being cooked, said briquets comprising carrier means and a seasoning liquid impregnated into the carrier means, said carrier means initially being dried and readily absorbant and afterwards forming between 70-90% of the weight of the briquets and the seasoning liquid forming between 10-30% of the weight of the briquets, said briquets being wet both in appearance and to the touch; the seasoning liquid being noncombustible and the briquets supporting combustion only after extended exposure to the heat of the coals; the seasoning liquid including spices in the form of liquid components of wine, soy sauce, whiskey, molasses and water, and solid components of bay leaves, onion powder, and garlic powder; the liquid and solid components being blended together in a ratio by weight of between 0.1-3% solid to 99.9-97% liquid.

2. Seasoning briquets according to claim 1, wherein said solid carrier means is in the form of hard wood of 1-3 inch blocks.

3. Seasoning briquets according to claim 1, wherein said solid carrier means is in the form of crushed shells of fruitwood nuts.

4. Seasoning briquets according to claim 3, wherein said nut shells include different kinds of nuts, including pecan nuts primarily, and at least two others from a group consisting of black walnuts, pistachio nuts, almond nuts, and chestnuts.

5. Seasoning briquets according to claim 1, wherein further the seasoning liquid includes a liquid smoke, and wherein said solid carrier means is in the form of hard wood of 1-3 inch blocks.

6. Seasoning briquets according to claim 1, wherein the liquid components of the seasoning liquid include 15-50% burgundy wine, 15-40% Chinese molasses, 15-40% Chinese oriental soy sauce, 2-10% bourbon whiskey, and 0.1-2% liquid smoke, and wherein the dry mix components of the seasoning liquid include 50-250 parts bay leaves, 0.5-5 parts onion powder, and 0.5-5 parts garlic powder.

7. Seasoning briquets according to claim 6, wherein said solid carrier means is in the form of hard wood of 1-3 inch blocks.

8. Seasoning briquets according to claim 1, wherein further the liquid components of the seasoning liquid include real lemon extract and distilled vinegar.

9. Seasoning briquets according to claim 1, wherein further the dry spices of the seasoning liquid includes black pepper, red pepper, and Jamacian all spice.

10. Seasoning briquets according to claim 1, wherein further the liquid components of the seasoning liquid include real lemon extract and distilled vinegar, and wherein further the dry spices of the seasoning liquid includes black pepper, red pepper, and Jamacian all spice.

11. Seasoning briquets according to claim 10, wherein said solid carrier means is in the form of crushed shells of fruitwood nuts.

12. For use in cooking food products with charcoal or artifically heated coals, briquets adapted to be placed directly on or proximate to hot coals effective to generate fumes and/or smoke for seasoning the food products with spices as the products are being cooked, said briquets comprising carrier means and a seasoning liquid impregnated into the carrier means, said carrier means initially being dried and readily absorbant and afterwards being more dense than the seasoning liquid and forming between 70-90% of the weight of the briquets and the seasoning liquid forming between 10-30% of the weight of the briquets, said briquets being both wet in appearance and to the touch, with excess seasoning liquid being on the solid carrier means; the seasoning liquid being noncombustible and the briquets supporting combustion only after extended exposure to the heat of the coals; the seasoning liquid including spices in the form of: liquid components of 30-35% burgundy wine, 30-35 Chinese molasses, 30-35% Chinese oriental soy sauce, 4-6% straight bourbon whiskey, 0.7-1% liquid smoke, and water; and dry mix components of 50-250 parts bay leaves, 0.5-5 parts onion powder, and 0.5-5 parts garlic powder, and the solid and liquid components, when blended together, being in a ratio by weight of between 0.1-3% solid components to 99.9-97% liquid components; the carrier means being of hard wood blocks of 1-3 inch dried to be combustible and readily absorbant.

13. For use in cooking food products with charcoal or artifically heated coals, briquets adapted to be placed directly on or proximate to hot coals effective to generate fumes and/or smoke for seasoning the food products with spices as the products are being cooked, said briquets comprising carrier means and a seasoning liquid impregnated into the carrier means, said carrier means initially being dried and readily absorbant and afterwards forming between 70-90% of the weight of the briquets and the seasoning liquid forming between 10-30% of the weight of the briquets, said briquets being both wet in appearance and to the touch, with excess seasoning liquid being on the solid carrier means; the seasoning liquid being noncombustible and the briquets supporting combustion only after extended exposure to the heat of the coals; the seasoning liquid including spices in the form of: liquid components of 35-45% burgundy wine, 30-35% Chinese oriental soy sauce, 12-15% Chinese molasses, 2-10% real lemon extract, 2-10% straight bourbon whiskey, and 0.02-0.5% distilled vinegar; and dry mix components including 2-10 parts onion powder, 2-10 parts garlic powder, 2-10 parts Burnese black pepper, 2-10 parts Burnese red pepper, 2-10 parts Jamacian all spice, and 0.5-5 parts bay leaves, and the solid and liquid components, when blended together, being in a ratio by weight of between 0.1-3% solid components to 99.9-97% liquid components; the carrier means being in the form of crushed shells of fruitwood nuts.

14. Seasoning briquets according to claim 13, wherein said nut shells include different kinds of nuts, including pecan nuts primarily, and at least two others from a group consisting of black walnuts, pistachio nuts, almond nuts, and chestnuts.

15. Seasoning briquets according to claim 14, wherein the nut shells include, by volume 40-90 parts pecan nuts, 0-15 parts black walnut nuts, 0-15 parts pistachio nuts, 0-15 parts almond nuts, and 0-15 parts chestnuts.

* * * * *